United States Patent

Nylund et al.

[11] Patent Number: 5,249,210
[45] Date of Patent: Sep. 28, 1993

[54] METHOD AND A DEVICE FOR CONTROL OF THE COOLANT FLOW IN THE FUEL ASSEMBLY OF A PRESSURIZED WATER REACTOR

[75] Inventors: Olov Nylund; Bertil Schölin, both of Västerås, Sweden

[73] Assignee: ABB Atom AB, Västerås, Sweden

[21] Appl. No.: 774,900

[22] Filed: Oct. 11, 1991

[51] Int. Cl.⁵ .............................................. G21C 3/30
[52] U.S. Cl. ...................................... 376/352; 376/445
[58] Field of Search ............... 376/352, 434, 439, 443, 376/445, 451, 210

[56] References Cited

U.S. PATENT DOCUMENTS

| | | | |
|---|---|---|---|
| 4,716,011 | 12/1987 | Talegarkham | 376/281 |
| 4,762,676 | 8/1988 | Gjertsen et al. | 376/443 |
| 4,859,407 | 8/1989 | Nylund | 376/446 |
| 4,994,234 | 2/1991 | Nylund | 376/445 |
| 5,066,453 | 11/1991 | Heppenstall et al. | 376/352 |

Primary Examiner—Donald P. Walsh
Assistant Examiner—Frederick H. Voss
Attorney, Agent, or Firm—Watson, Cole, Grindle & Watson

[57] ABSTRACT

A method and a device for controlling the coolant flow to the fuel rods (1) in the fuel assembly of a pressurized-water reactor, fuel assembly including an elongated bundle of control rod guide tubes and fuel rods (1) which is arranged between a top nozzle and a bottom nozzle. The bundle is retained by spacers (2) supported by the control rod guide tubes and the top and bottom nozzles are provided with a plurality of openings for the coolant flow. According to the invention, the coolant flow along the fuel rods (1) of a fuel assembly which is under low load is reduced by the insertion of special, or the activation of existing, throttle or guide members (10,11,12,13,16) on the spacers (2) or on the fuel rods (1) between the spacers (2) such that the coolant flow is diverted to one or more adjacent fuel assemblies.

5 Claims, 6 Drawing Sheets

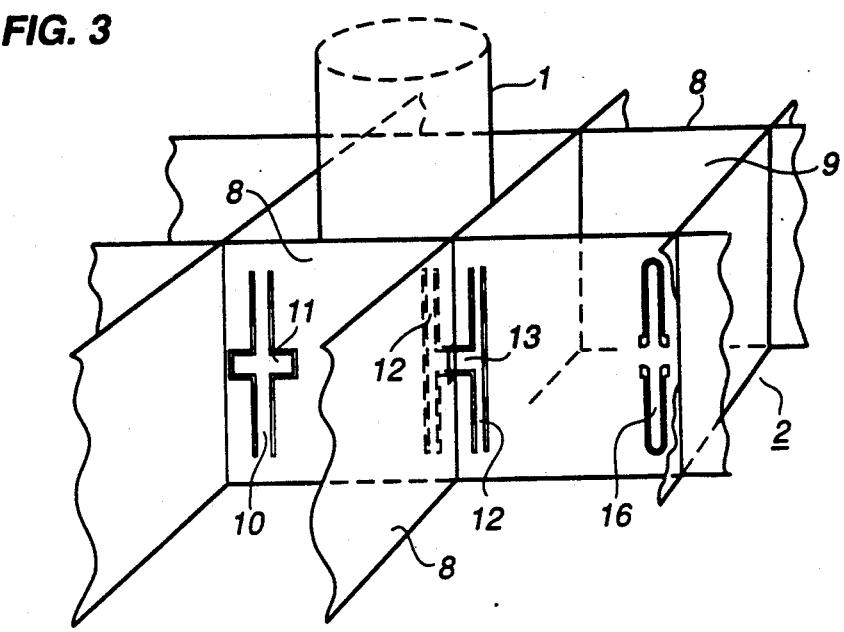
FIG. 3
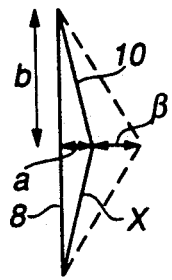
FIG. 7
FIG. 4
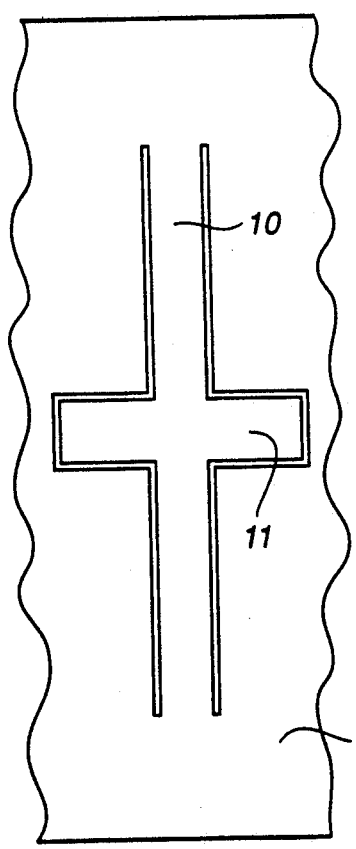
FIG. 5 FIG. 6
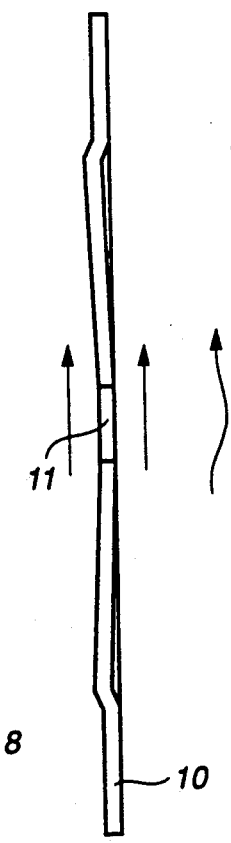 
FIG. 8
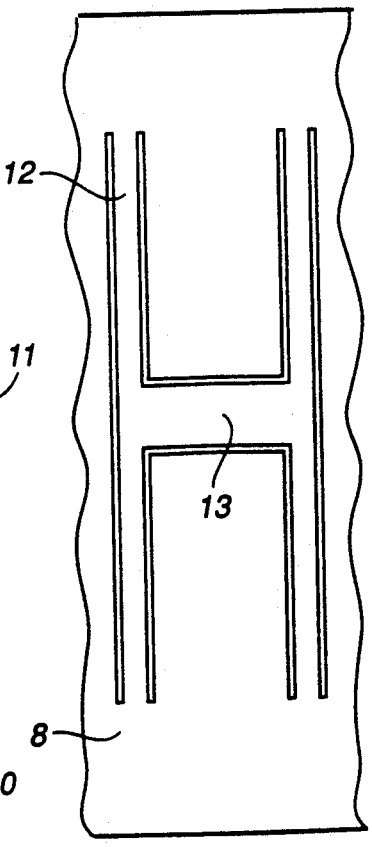

METHOD AND A DEVICE FOR CONTROL OF THE COOLANT FLOW IN THE FUEL ASSEMBLY OF A PRESSURIZED WATER REACTOR

BACKGROUND OF THE INVENTION

In a pressurized-water reactor, a fuel assembly consists of a top nozzle and a bottom nozzle provided with a plurality of openings for the coolant flow. Between the nozzles a number of elongated guide tubes for control rods are arranged. The guide tubes support a plurality of spacers arranged one after the other. The spacers often consist of a number of plates standing on edge and arranged crosswise so as to form a plurality of cells. Fuel rods are inserted into these cells so that the fuel rods together with the control rod guide tubes form an elongated bundle. Unlike a fuel assembly for a boiling water reactor, a fuel assembly for a pressurized-water reactor is not provided with a surrounding casing, but the cooling water which flows in through the openings in a bottom nozzle may be diverted laterally such that it flows over to an adjacent fuel assembly.

Further, it is obvious that the lower the power output from a fuel assembly, the less cooling it needs. Inversely, a higher power may be taken out from a fuel assembly according as its cooling improves. It is also true that the more fuel that is consumed in a fuel assembly, the lower power may subsequently be taken out from the fuel assembly.

From, for example, Swedish Patent 8801141-6 (U.S. Pat. No. 4,994,234) it is known to achieve a control of the coolant flow through a fuel assembly for adaptation to the degree of burnup of the fuel rods. According to this invention, the ends of the elongated fuel rods are adapted to the openings in the top nozzle or the bottom nozzle in order to gradually seal these openings in case of an irradiation-growing linear expansion, thus reducing the coolant flow through the fuel assembly. However, this device does not function very well in a pressurized-water reactor in which the fuel assembly has no surrounding casing. When the coolant flow through, for example, the bottom nozzle is cut and the coolant flow pressure is reduced in the fuel assembly, it may occur that coolant flow with a higher pressure flows over from adjacent fuel assemblies—which, of course, is not desirable.

SUMMARY OF THE INVENTION

The present invention relates to a method and a device according to which the coolant flow, by means of throttle or guide members arranged along the fuel rods between the top nozzle and the bottom nozzle, is transferred from the fuel assembly which is under low load to adjacent fuel assemblies. In this way, coolant flow is prevented from flowing over from these fuel assemblies to the fuel assembly under low load, but instead flows in the opposite direction.

Thus, the invention relates to a method for controlling the coolant flow to fuel rods in the fuel assembly of a pressurized-water reactor, which assembly comprises a top nozzle and a bottom nozzle provided with a plurality of openings for the coolant flow. The nozzles are interconnected by means of control rod guide tubes which support a plurality of spacers arranged one after the other along the control rod guide tubes. The spacers include a plurality of cells in which the fuel rods are arranged so as to form together with the control rod guide tubes an elongated bundle between top nozzle and bottom nozzle. The fuel assembly is open to laterally flowing coolant flow. According to the invention, the coolant flow supplied to the fuel assembly through the bottom nozzle along the fuel rods located in the assembly is reduced either by automatic and gradual activation of load-dependent throttle or guide members arranged on the spacers, or after a certain time of burnup of the fuel in the assembly by the insertion of throttle members on or between the spacers, or bending of guide members present on the spacers such that the coolant flow is diverted to one or more adjacent fuel assemblies.

In the above way, adjacent fuel assemblies can be loaded to a higher extent without increasing the risk of so-called DNB (=Departure from Nucleate Boiling) on the surface of the fuel rods, which may lead to fuel damage. By diverting the coolant flow through the reactor core from (partially burnt-up) fuel assemblies under low load to fuel assemblies with fresh fuel in this way, the maximum output power from the reactor can be increased by as much as 10% in favourable cases.

According to a particularly suitable embodiment of the invention, the spacers are provided with load-dependent throttle or guide members which are arranged to automatically and gradually divert the flow through a fuel assembly, concurrently with the fuel therein being consumed, to adjacent fuel assemblies which are under higher load.

The throttle or guide members include irradiation-dependent elements which upon neutron irradiation have a greater linear expansion than those parts of the spacers which are connected to the elements. This results in the throttle or guide members being influenced, in dependence on the received neutron irradiation, to increase their throttling or guiding of the coolant flow, which is thereby to an increasing extent diverted to an adjacent fuel assembly The longer a fuel assembly is in operation, the greater the amount of neutron irradiation received and the greater the diversion of the coolant flow.

According to another alternative, during refuelling of the reactor the throttle means is manually inserted, or guide fins are bent on the spacers in a fuel assembly which has partially spent fuel such that the coolant flow through this fuel assembly is reduced and diverted to an adjacent fuel assembly.

BRIEF DESCRIPTION OF THE DRAWINGS

The invention will be most readily understood with reference to the accompanying FIGS. 1-19, wherein

FIG. 3 is a schematic perspective view of part of the interior of a spacer, showing a few possible embodiments of the invention;

FIG. 4 shows a cruciform throttle member; and

FIG. 5 shows the same throttle member seen from the side in non-irradiated state; and FIG. 6 shows the same throttle member in irradiated state;

FIG. 7 schematically shows the same throttle member seen from the side;

FIG. 8 shows an H-formed throttle member;

DETAILED DESCRIPTION OF THE PREFERRED EMBODIMENT

Figure 1:
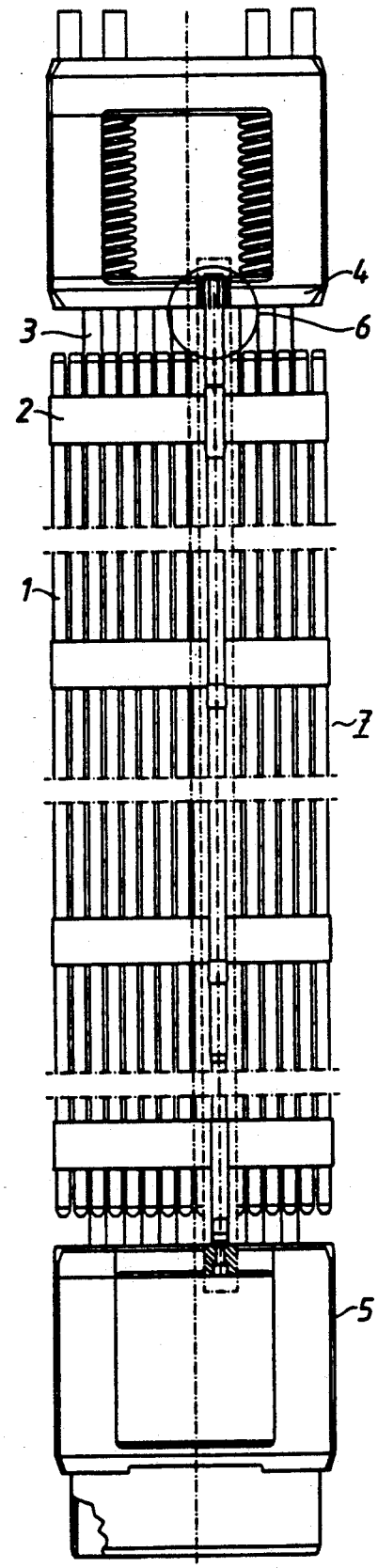
FIG. 1 shows a fuel assembly for a pressurized-water reactor.

FIG. 1 shows a fuel assembly 7 in a pressurized-water reactor (PWR). In the figure, 1 designates fuel rods which are retained into a bundle by spacers 2. The spacers 2 are fixed to the guide tubes 3 for control rods. The ends of the guide tubes 3 extend somewhat outside the bundle and are fixed to the top nozzle 4 and the bottom nozzle 5, as shown in the circle 6. The top and bottom nozzles 4, 5 are provided with through-holes (not shown) for a coolant flow of water. FIG. 1 further shows that the fuel assembly 7 has no casing, which means that the coolant flow, after having passed the bottom nozzle 5, may, in principle, leave the fuel assembly 7 anywhere along the assembly and flow out to the side. Fuel assemblies 7 of this type are placed side-by-side in the core so that the spacers support each other. This means that the coolant flow from a fuel assembly 7 may be guided over to another, adjacent fuel assembly 7.

Figure 2:
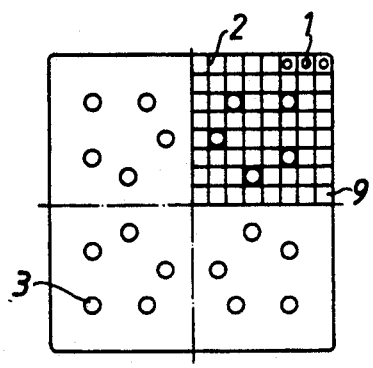
FIG. 2 is a section through a spacer in FIG. 1.

As schematically shown in FIGS. 2 and 3, the spacers 2 are composed of a number of plates 8, placed on edge, which are arranged crosswise so as to form a plurality of cells 9, in which fuel rods 1 and control rod guide tubes 3 are arranged.

FIG. 3 shows a number of possible embodiments of the invention. According to a first alternative, a throttle member is arranged by punching out (or otherwise) an elongated vertical plate strip 10 in the plate 8. The plate strip 10 is joined to the plate 8 at its ends and is suitably provided in the middle with a transverse strip 11 so as to form a cruciform member according to FIGS. 4 and 5. The cruciform throttle member 10, 11 is now made in, for example, cold-worked Zircaloy, whereas the surrounding plate 8 is, for example, stress-relieve annealed or so-called β-quenched Zircaloy, the cold-worked part receiving a higher irradiation growth than the β-quenched or stress-relieve annealed one.

To be certain as to in which direction the throttle member will bulge upon neutron irradiation, it must initially be upset to a certain extent, as shown in FIG. 5. This upsetting may suitably take place in connection with the punching of the throttling member which is formed from the plate strip 10 and the crossing strip 11.

FIG. 6 shows how the plate strip 10 after a certain time of neutron irradiation has increased its bulged and hence also, of course, increased the throttling through the spacer 2 in FIG. 3.

FIG. 7 schematically shows the throttle member seen from the side, the plate strip 10 being given an initial bulge a corresponding to the height of the triangle and its base the length 2b (corresponding to β-quenched plate 8). If it is assumed that b=10 mm and a=0.3 mm, half the length of the plate strip 10 will be equal to $$x = \sqrt{10^2 + 0.3^2} = 10.0045$$

Further, if the plate strip 10 grows in length 0.2% more than does the plate 8, this gives an increase in length Δ of half the plate strip 10 equal to 0.002·10.0045=0.02 mm.

$$x + \Delta = 10.0245 \text{ mm}.$$

Now, if the bulge increases by δ, the following is obtained $$0.3 + \delta = \sqrt{10.0245^2 - 10^2} = 0.700$$

That is, δ=0.4 mm.

If the base 2b were to increase by 50%, it could be expected that also the bulge would increase by 50%, that is, in this case δ would be 0.6 mm. A typical value of the plate thickness is 0.5 mm.

If a number of throttle members of the above type are inserted in each spacer 2, and if at the same time the strip 11 is made as long as is possible considering the design of the spacer (2) in other respects, a considerable throttling effect in the spacer 2, after a lengthy time of neutron irradiation thereof, may be expected.

Figure 9:
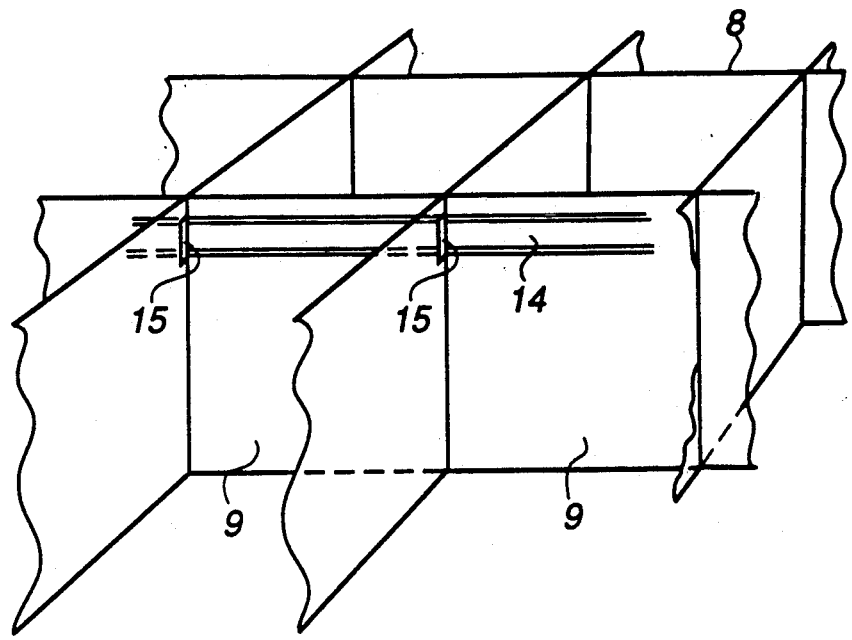
FIG. 9 shows a horizontal throttle member extending over several cells.

As shown in FIG. 3 and FIG. 8, the throttle member may alternatively be given an H-shape composed of two parallel vertical rods 12 and a horizontal crossbar 13. A further alternative is shown in FIG. 9 in which a horizontal bar 14, extending over several cells, is punched out in the plate 8. To impart to this bar 14 a possibility of curving into the cells 9 and bring about throttling, recesses 15 for this have to be provided in the transverse plates 8. In both of these latter alternatives, the rods 12 and the bar 14, respectively, are made of a material with a high irradiation growth.

A further possibility of achieving throttling is shown in FIG. 3, in which 16 designates an elongated plate band which, in the middle, is joined to the plate 8. This plate band 16 functions according to the same principle as a bimetallic spring. One side of the band has been coldworked so as to have a greater irradiation-dependent linear expansion than the other side which has been β-quenched or stress-relieve annealed. This means that the free band ends curve into the cell 9 when being irradiated for a long period of time, thus achieving throttling of the spacer 2. (β-quenching means heating to about 1000° C., the material then changing into β-phase, whereupon rapid cooling is performed. This gives a low irradiation growth. The irradiation growth is influenced by the degree and form of cold working (crystal orientation, texture) and by the subsequent heat treatment. Stress-relieve annealing can be performed at different temperatures and for different times, which causes the cold working effect to disappear to a greater or smaller extent.)

Figure 10:
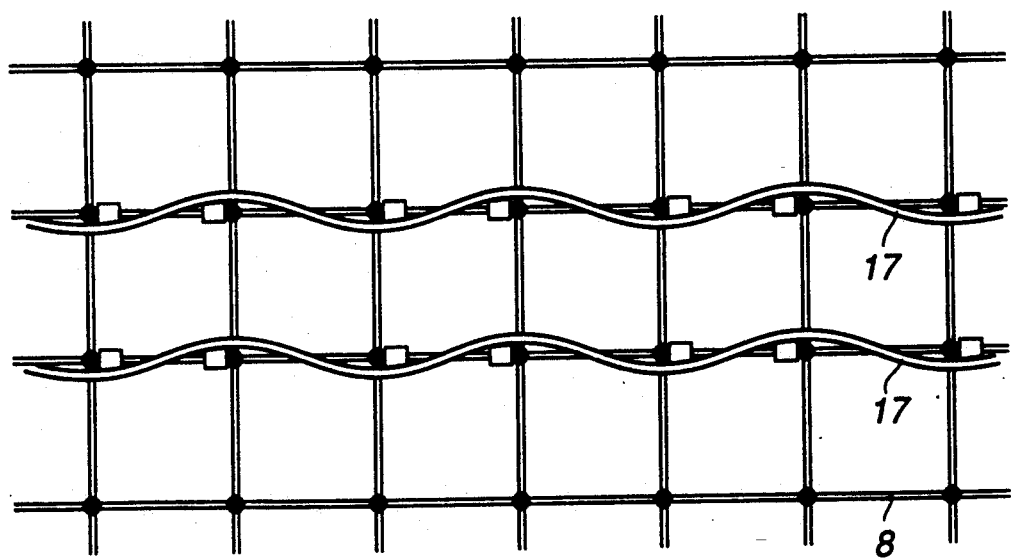
FIG. 10 shows throttling by the insertion of additional plates in the so-called fuel rod lanes.
Figure 11:
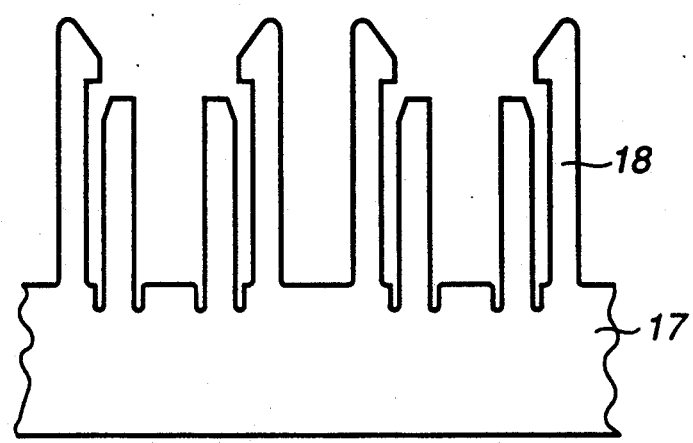
FIGS. 11 and 12 show snap-on devices seen from the front and from the side for the additional plates.
Figure 12:
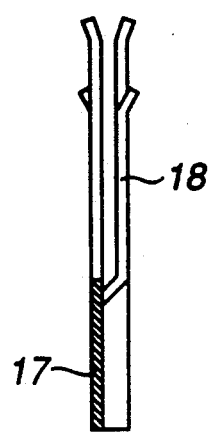
Figure 13:
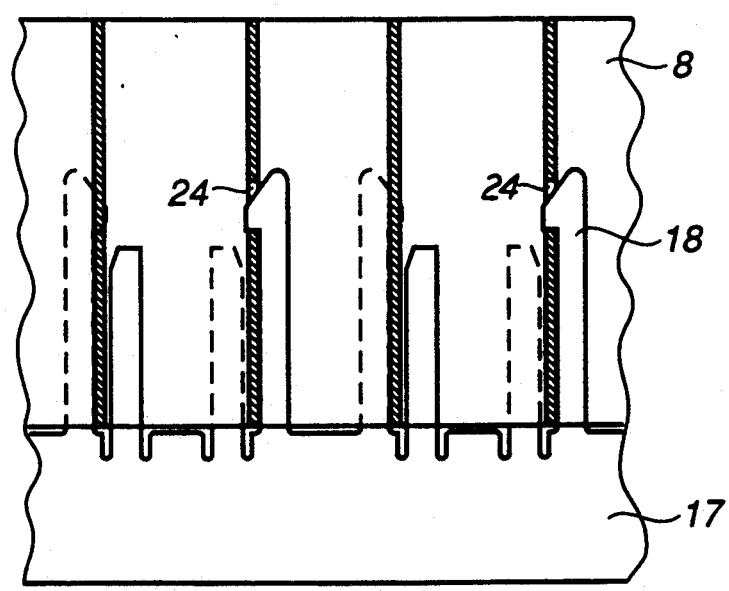
FIG. 13 shows the application of the additional plate onto a spacer plate with the aid of the snap-on devices.
Figure 14:
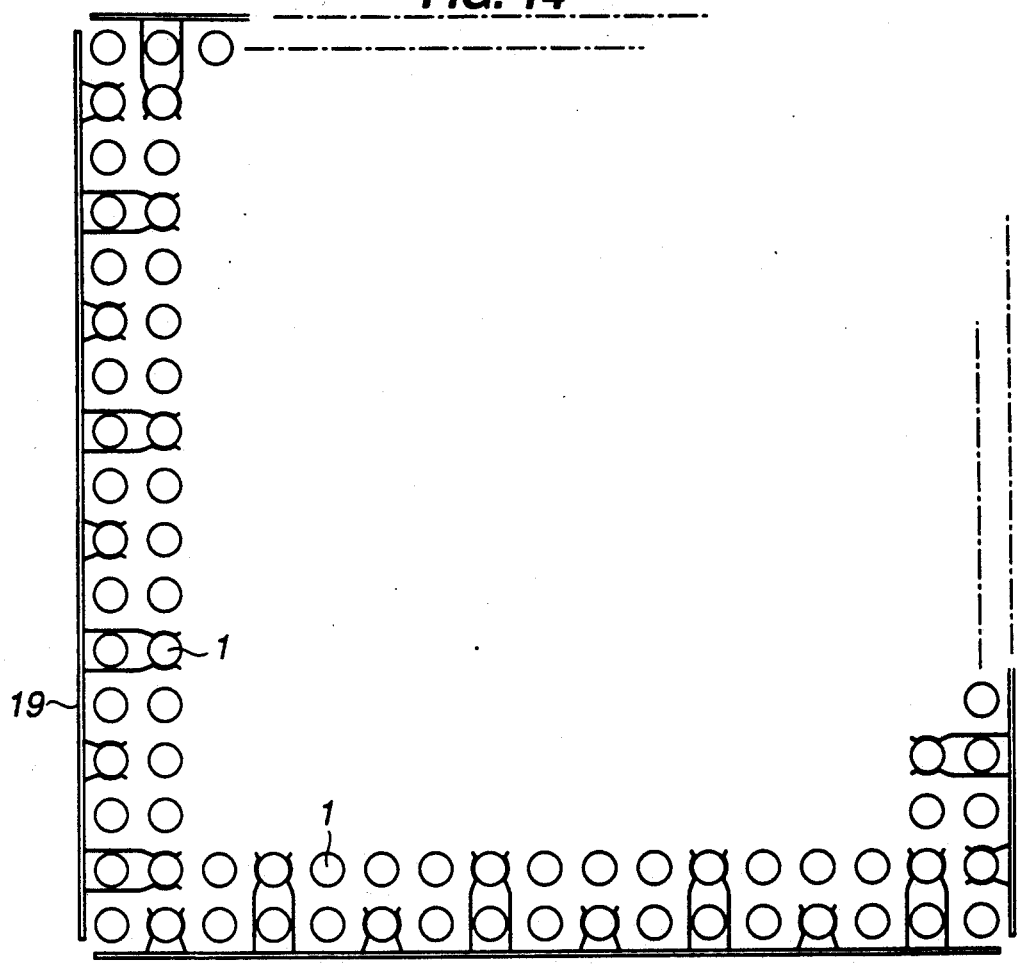
FIGS. 14 and 15 show additional plates snapped directly onto the fuel rods.
Figure 15:
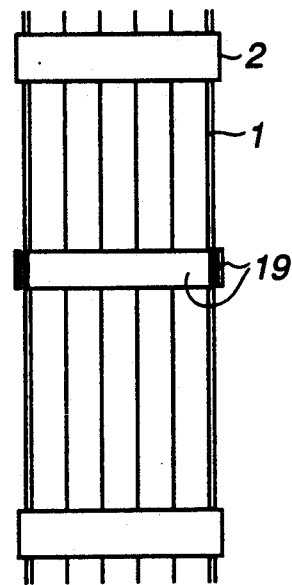

According to a manual method, the desired throttling is achieved by the introduction, during refuelling, of wavy additional plates 17 in the so-called lanes for the fuel rods 1, as shown in FIG. 10. The shape of the additional plates may, of course, be varied to provide the desired throttling for different spacer designs. The additional plate 17 is applied to the edges of the plates 8 of the spacers 2, which plates are placed on end. By providing the wavy additional plate 17 with snap-on means 18, as shown in FIGS. 11 and 12, the additional plate may be snapped onto the plates 8 which, in turn, must be provided with holes 24 for receiving the snap-on means 18 (see FIG. 13). The additional plates result in increased throttling of the spacer. To increase the throttling, the number of additional plates 17 on each spacer 2 are increased and also the number of spacers 2 which are provided with additional plates 17 are increased. Yet another method of achieving increased throttling comprises snapping a few brake plates 19, between the spacers, onto the outer row of fuel rods 1 in the fuel assembly 7. Such an embodiment is shown in FIGS. 14 and 15 where the flow in the outer edge of the fuel assembly 7 is disturbed by snapping the brake plate 19 over a number of fuel rods 1 during refuelling. Combinations of embodiments according to FIGS. 10-13 and FIG. 14 are, of course, feasible.

According to the invention, the desired redirection of the coolant flow through a fuel assembly 7 may also take place by the automatic activation of special guide fins on the spacer 2, or by manually bending these fins during a refuelling operation.

Figure 16:
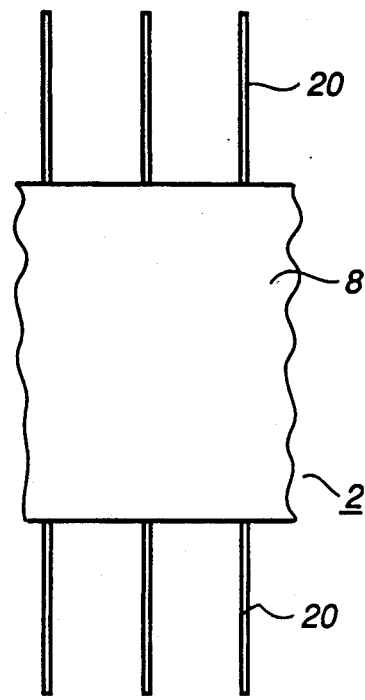
FIG. 16 shows guide fins on a spacer prior to neutron irradiation or, alternatively, manual bending.
Figure 17:
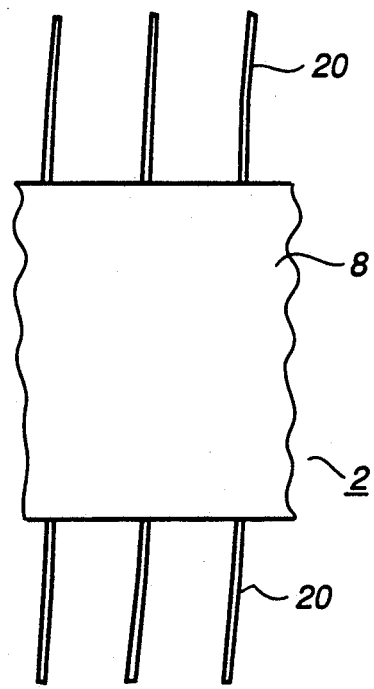
FIG. 17 shows the same guide fins after neutron irradiation etc.

FIG. 16 shows a spacer 2 which is provided with such guide fins 20, both upstream and downstream. In a fuel assembly 7 with fresh fuel, that is, fully loaded, the guide fins are directed parallel to the bundle of fuel rods 1. When the fuel in the associated fuel assembly 7 has been burnt up to a certain extent, the guide fins 20 can be manually bent, as shown in FIG. 17, during a reloading of the reactor and a consequential shuffling of the fuel assembly. This forces the coolant flow to change its direction and it can thus be guided out to the side to an adjacent fuel assembly 7.

This redirection of the flow can also be made automatically by designing the guide fins 20 along the principle of a bimetallic spring, as previously mentioned for the plate band 16, that is, one side of each guide fin 20 is made with a greater irradiation growth than the other.

Figure 18:
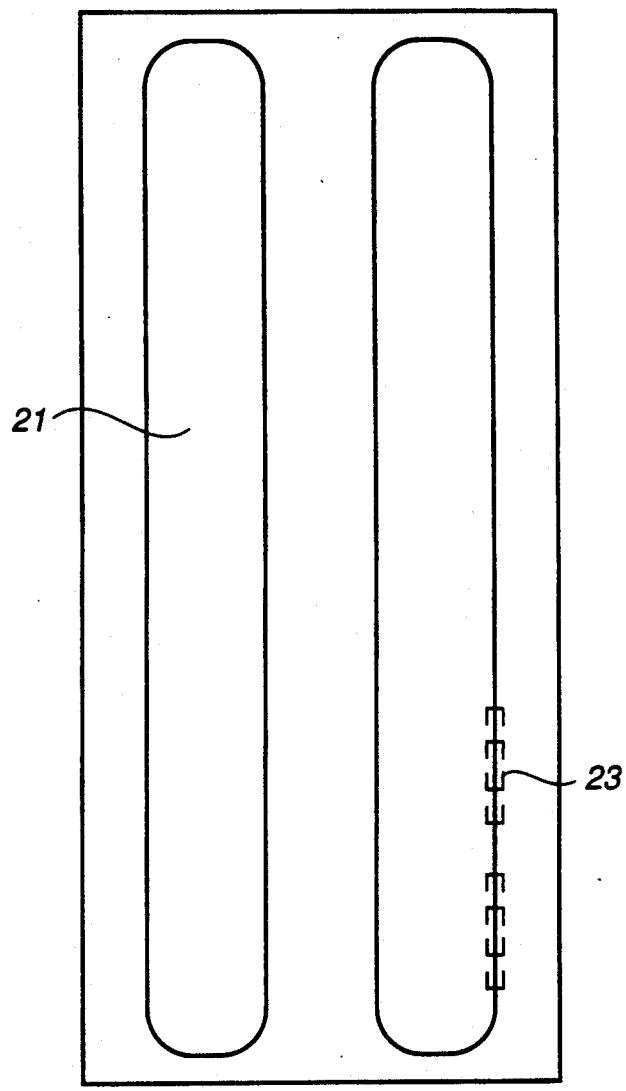
FIGS. 18 and 19 show a plate strip, one side of which has been given a higher irradiation growth than the other.
Figure 19:
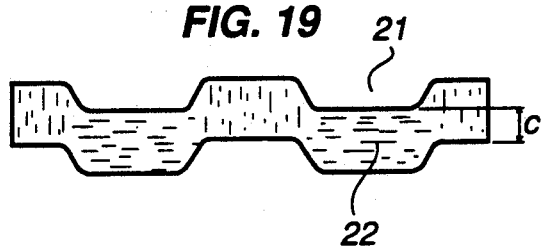

One possible way of achieving a plate band 16 or a guide fin 20, which possesses the above-mentioned properties, is shown in FIGS. 18 and 19. Elongated depressions 21 are then embossed in the plate. The plate is normally stress-relieve annealed or β-quenched whereas the bottom of the depressions is cold-worked. The embossing gives a well-defined lateral displacement c which determines the bending of the plate. Possibly, short slits 23 may be provided along the border around the depressions 21 embossed in the plate to facilitate selective heat treatment of material in the depressions in relation to surrounding material.

In case of load-dependent throttling, different phenomena related to the operating time may, in principle, be utilized, such as oxide build-up, crud build-up, swelling, fatigue or creep strain (radiation dependence and load dependence may also be included in these phenomena).

Elements in the spacer which are under low load and which have a suitable geometrical shape are given poor corrosion resistance, in which case a high oxide growth or corroding away of material directly or indirectly leads to increased flow resistance.

Crud build-up may be influenced both as regards the tendency to deposits and its effect on the flow resistance, for example by the provision of flow gaps.

Swelling can be obtained, besides by oxide build up, also through enclosed hygroscopic material (e.g. magnesium oxide powder), which are brought into contact with water by slow diffusion or corrosion.

By fatigue breakdown at predetermined points, deformations causing increased flow resistance can be obtained.

By creep strain of, for example, fins subjected to flow load, an increasing flow resistance can be obtained. In this case, the irradiation is also an important factor.

An irradiation-dependent material is an anisotropic metal, for example a zirconium alloy of Zircaloy type.

We claim:

1. A device for controlling the coolant flow to fuel rods in a fuel assembly of a pressurized-water reactor, said fuel assembly comprising a top nozzle and a bottom nozzle provided with a plurality of openings for the coolant flow as well as control rod guide tubes interconnecting said top and bottom nozzles, a plurality of spacers arranged one after the other along the control rod guide tubes and supported by the control rod guide tubes and containing a plurality of cells in which the fuel rods are arranged so as to form together with the control rod guide tubes an elongated bundle between the top and bottom nozzles, said fuel assembly being open for laterally flowing coolant flow, said spacers being composed of plates standing on end and arranged crosswise, wherein one or more elongated plate strips are punched out or otherwise provided in the plates in a spacer, the ends of said plate strips being joined to the plates from which they are punched, the plate strips being designed with higher irradiation growth such as by cold working than the rest of the plate which is hot-annealed or has undergone so-called β-quenching, said plate strips being upset so as to bulge from the plate in a predetermined direction upon neutron irradiation, thus resulting in increased throttling of the coolant flow through said spacer.

2. A device according to claim 1, wherein the punched out plate strip is cruciform, a transverse strip thereof contributing to increase the throttling.

3. A device according to claim 1, wherein two parallel plate strips or rods are joined in the middle to a crossbar such that the rods and the crossbar form an H.

4. A device for controlling the coolant flow to fuel rods in a fuel assembly of a pressurized-water reactor, said fuel assembly comprising a top nozzle and a bottom nozzle provided with a plurality of openings for the coolant flow as well as control rod guide tubes interconnecting said top and bottom nozzles, a plurality of spacers arranged one after the other along the control rod guide tubes and supported by the control rod guide tubes and containing a plurality of cells in which the fuel rods are arranged so as to form together with the control rod guide tubes an elongated bundle between the top and bottom nozzles, said fuel assembly being open for laterally flowing coolant flow, said spacers being composed of plates standing on end, wherein one or more elongated plate bands are punched out or otherwise provided in the plates, said plate bands being joined only in the middle to the plates from which they are punched out, one side of the plate bands consisting of a material with a higher irradiation growth than the other side thereof so that the free ends of said plate bands, upon being exposed to neutron irradiation, curve into the cells, thus resulting in increased throttling of the coolant flow through said spacers.

5. A device for controlling the coolant flow to fuel rods in the fuel assembly of a pressurized-water reactor, said fuel assembly comprising a top nozzle and a bottom nozzle provided with a plurality of opening for the coolant flow as well as control rod guide tubes interconnecting said top and bottom nozzles, a plurality of spacers arranged one after the other along the control rod guide tubes and supported by the control rod guide tubes and containing a plurality of cells in which the fuel rods are arranged so as to form together with the control rod guide tubes an elongated bundle between the top and bottom nozzles, said fuel assembly being open for laterally flowing coolant flow, said spacers being composed of plates standing on end, wherein guide fins are arranged on at least one of the upstream and downstream edges of the plates, said guide fins extending in the direction of the coolant flow, one side of said fins consisting of a material with a higher irradiation growth than the other side thereof, said fins being adapted, during neutron irradiation, to be automatically bent in such a direction that the coolant flow along the fuel rods is gradually laterally diverted to adjacent fuel assemblies.

* * * * *

UNITED STATES PATENT AND TRADEMARK OFFICE
CERTIFICATE OF CORRECTION

PATENT NO. : 5,249,210
DATED : September 28, 1993
INVENTOR(S) : Nylund et al.

It is certified that error appears in the above-identified patent and that said Letters Patent is hereby corrected as shown below:

On title page, insert, item

[30] Foreign Application Priority Data

Oct. 18, 1990 [SE] Sweden............9003330

Signed and Sealed this

Twenty-second Day of March, 1994

Attest:

BRUCE LEHMAN

Attesting Officer      Commissioner of Patents and Trademarks